May 14, 1963   H. G. NACHTSHEIM ETAL   3,089,786
PRESSURE-SENSITIVE ADHESIVE TAPE
Filed July 13, 1959
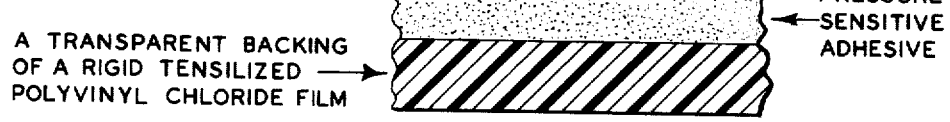
A TRANSPARENT BACKING OF A RIGID TENSILIZED POLYVINYL CHLORIDE FILM
PRESSURE-SENSITIVE ADHESIVE
*INVENTORS*
HENRY G. NACHTSHEIM
EDWARD J. MEYER
PAUL GRANDE
Carpenter, Abbott, Coulter & Kinney
ATTORNEYS

United States Patent Office 3,089,786
Patented May 14, 1963

3,089,786
PRESSURE-SENSITIVE ADHESIVE TAPE
Henry G. Nachtsheim, St. Paul, Edward J. Meyer, North St. Paul, and Paul Grande, Roseville, Minn., assignors to Minnesota Mining and Manufacturing Company, St. Paul, Minn., a corporation of Delaware
Filed July 13, 1959, Ser. No. 826,406
2 Claims. (Cl. 117—122)

This invention relates to an improved pressure-sensitive adhesive tape, utilizing a transparent rigid, tensilized film of vinyl chloride polymer as the backing.

Ever since the initial introduction of transparent film-backed pressure-sensitive adhesive tapes, invented by Drew as described in his pioneer U.S. Patent 2,177,627, cellophane has been utilized almost exclusively as the backing thereof for tapes employed for sealing packages and for general usage in offices, stores and homes, which account for the main sales volume. Extensive efforts to find a satisfactory and economical replacement for the cellophane backing film have been made for many years, the undesirable characteristics of cellophane backings having been apparent since cellophane tape was put on the market in 1930.

Notwithstanding certain undesirable properties, cellophane pressure-sensitive adhesive tape had desirable properties which made it unique and it enjoyed wide public acceptance and achieved extensive commercial success. Its dispensability in conventional manual dispensers having a serrated edge for severing the tape, and its rigidity to facilitate handling and to facilitate use in automatic machine dispensers, are two of the outstanding properties of the cellophane pressure-sensitive adhesive tapes. Other available films within the permissible cost range were invariably found to be unsuitable as a general substitute for cellophane.

Among the properties of cellophane that contribute to its effectiveness as a tape backing are clarity, mechanical strength with high stiffness modulus, and resistance to organic solvents utilized in applying the pressure-sensitive adhesive.

The principal shortcoming of cellophane pressure-sensitive adhesive tapes is their sensitivity to moisture. At low humidities they become brittle and tear too easily. Upon exposure to high humidity a roll of cellophane tape "telescopes" as a result of the increase of caliper of the tape at its edges, and also becomes difficult to tear. This hygrospopic characteristic also presents numerous problems in the manufacture of the tape requiring the use of specially prepared cellophane and requiring complex processing techniques. The aggressively tacky nature of the adhesive results in considerable strains on the cellophane during unwinding of rolls and during handling of the adhesive coated cellophane web in the course of the tape manufacturing operations.

Various films have been suggested and employed to a limited extent as a substitute for cellophane in tape backings. Uniformly, they have failed to offer a combination of physical properties which are equal to or better than cellophane as a backing for an all-purpose transparent pressure-sensitive adhesive tape. For instance, polyethylene terephthalate (e.g. "Mylar") tapes are extremely difficult to tear and cellulose acetate tapes are too easy to tear. Oriented polystyrene films are too brittle and have poor solvent resistance. Tapes prepared from films of polyethylene, vinylidene chloride copolymers (e.g., "saran"), or highly plasticized polyvinyl chloride, have low mechanical strength and stiffness modulus and are difficult to tear. As with the above films, polyvinyl chloride has long been known to have properties desirable for a tape backing, such as its resistance to moisture. However, oriented polyvinyl chloride films of the type available prior to this invention, such as those made by the Luvitherm process and sold under the trademarks "Vynan," "Polytherm," "Genotherm," and "Nicotherm," produced tapes which were too hard to tear in conventional dispensers, too poor in clarity, too low in resistance to splitting and to bursting forces, and difficult to manufacture because of the tendency of the film web to split in the lengthwise direction. A common deficiency of heretofore available films which have been considered as a substitute or replacemnet for cellophane has been the poor dispensability imparted to pressure-sensitive adhesive tapes made therefrom.

The present invention makes possible for the first time, so far as we are aware, both clear and colored transparent pressure-sensitive adhesive tapes having the virtues without the defects of cellophane-backed tapes and which can be manufactured at a comparable or even lower cost. The clarity and transparency of the backing also makes possible the preparation of colored non-transparent tapes by incorporating a pigment in the adhesive layer.

The present film may also be used as the backing or support for the adhesive coatings in double-coated pressure-sensitive adhesive tapes (which have adhesive coatings on both faces of the film), including the linerless types described in U.S. Patent 2,889,038, which are adapted to be dispensed in conventional manual cellophane tape dispensers.

The novel backings employed to make possible the tapes of this invention are "tensilized" and "cross-toughened" polyvinyl chloride films which are clear and transparent, flexible and non-brittle, adequate in lengthwise and crosswise strength and not prone to splitting, and which are "rigid" so as to have a high resistance to stretching. "Rigid" designates a film that has a high stiffness modulus value and is capable of retaining its shape under normal tape manufacturing and use conditions. "Tensilized" indicates that the film has been drawn (stretched) so as to orient its polymer molecules. "Cross-stretched" encompasses the techniques of imparting the specified crosswise elongation and cross-wise tensile strength to the film in balance with the requisite lengthwise properties which is best accomplished by stretching the film in one direction and then in the other or by stretching in one direction only in a manner designed to minimize or eliminate any reduction of the width of the film, i.e., control the "neck down." Pressure-sensitive adhesive tapes prepared from these novel transparent polyvinyl chloride film backings possess the above enumerated advantages of cellophane tapes and various characteristics superior to the best type of cellophane for the manufacture of a commercial all-purpose transparent pressure-sensitive adhesive tape. For example, they are unaffected by high and low humidities normally encountered throughout the United States. The tapes utilizing this film possess the requisite properties of dispensability and clarity heretofore lacking in tapes prepared from polyvinyl chloride films. The FIGURE of the illustration shows the structure of pressure-sensitive tape of this invention.

We have empirically discovered on the basis of a large number of experiments that for present purposes the polyvinyl chloride film should have a caliper of from 1 to 2 mils, a lengthwise stiffness modulus of at least $4.5 \times 10^5$ pounds per square inch of cross-sectional area measured at 1 percent elongation, a lengthwise elongation at break of less than 100 percent (preferably less than 60 percent), a crosswise elongation at break of at least 25 to 150 percent (preferably at least 50 percent), a lengthwise tensile strength of at least 13,000 pounds per square inch, and a crosswise tensile strength of at least 4000 pounds per square inch (preferably at least 7000). A valuable characteristic of our polyvinyl chloride film backing is its negligible "hot stretch," i.e. less than 2 percent stretching at coating temperatures in the range of 120° F. to 140° F.

These limitations as to the physical characteristics of the film, and economical film and tape manufacturing, are not obtainable if the polyvinyl chloride film has been subjected to a temperature above about 250° F. during or after the tensilization processing.

The above-enumerated properties are primarily imparted to the polyvinyl chloride film backing by orientation. A variety of orientation or tensilizing techniques may be employed, such as the following:

(1) Lengthwise stretching of the film web over heated idler rolls between two sets of nip rolls, followed by crosswise stretching in a heated oven, the stretching being effected by use of a tentering frame in which the moving web is gripped along its edges by two series of clips attached to a pair of diverging driven endless chains.

(2) Lengthwise stretching of the film web over heated idler rolls in a manner such that the width of the film is not materially reduced. In this procedure no crosswise stretching apparatus, such as a tentering frame, is required.

(3) Lengthwise stretching of a heated film web over idler rolls between two sets of nip rolls, followed by crosswise stretching in a tentering frame while being heated by passing over a heated plate.

(4) Lengthwise stretching of the film web between two sets of nip rolls in a heated oven followed by crosswise stretching in a tentering frame while passing through a heated oven.

As will be apparent from the working examples, the stretch ratios may also be substantially varied with the lengthwise stretch usually being greater than the crosswise stretch.

Instead of using a tentering frame, use can be made of other suitable cross-stretching machines, such as a Kampf cross-stretcher. Radiant heating, or use of heated baths, can be used for heating the film web.

Preparation of the film webs to be oriented may be accomplished by calendering or extrusion of the polyvinyl chloride. These films are usually 3 to 8 mils thick. Processing aids, which are solids at room temperature but soften at elevated temperatures to act as a plasticizer, may be incorporated in the polymer formulation. These processing aids materially reduce the calendering temperatures and help in this manner to minimize the thermal degradation and discoloration of the polymer. One such aid, which will be referred to as "processing aid A" in the working examples is "Acryloid K120," a product of the Rohm and Haas Company, which is reported to be a low molecular weight polymethyl methacrylate.

Various vinyl chloride polymer stabilizers may be incorporated into the polyvinyl chloride film backings. The physical properties and characteristics of the commercially available stabilizers employed in the working examples are set forth below.

STABILIZERS (A) "Paraplex G62," a product of the Rhom and Haas Company which is reported to be epoxidized soybean oil having an acid number of 0.3 and a specific gravity of 0.993 at 25° C.

(B) "Advastab C-77," a product of the Advance Solvents Company, reported to be a cadmium complex as follows:

Form _____ Clear thin liquid.
Color (Gardner-Holdt) _____max__ 6.
Specific gravity (20° C.) _____ 1.04–1.07.
Refractive index (20° C.) _____ 1.492.
Viscosity (25° C.) _____centipoises__ 50.
Pounds/gallon _____ 8.9.

(C) "Advastab BC-105," a product of Advance Solvents Company reported to be a mixture of barium and cadmium fatty acid salts as follows:

Form _____ Clear liquid.
Color (Gardner-Holdt) _____max__ 7.
Specific gravity (20° C.) _____ 1.13–1.15.
Refractive index (20° C.) _____ 1.482.
Viscosity (25° C.) _____centipoises__ 125.
Pounds/gallon _____ 9.05.

(D) "Advastab CH-49," a product of Advance Solvents Company, reported to be as follows:

Form _____ Clear liquid.
Color (Gardner-Holdt) _____max__ 2.
Specific gravity (20° C.) _____ 1.025–1.04.
Refractive index (20° C.) _____ 1.500.
Viscosity (25° C.) _____centipoises__ 250.
Pounds/gallon _____ 8.6.

(E) "Advastab BC-100," a product of Advance Solvents Company, reported to be a mixture of barium and cadmium compounds as follows:

Form _____ Clear liquid.
Color (Gardner-Holdt) _____max__ 9.
Specific gravity (20° C.) _____ 0.950–0.970.
Refractive index (20° C.) _____ 1.470.
Viscosity (25° C.) _____centipoises__ 25.
Pounds/gallon _____ 8.0.

(F) "Advastab CH-300," a product of the Advance Solvents Company, reported to contain an organic phosphite as follows:

Form _____ Clear liquid.
Color (Hazen) _____max__ 100.
Specific gravity (20° C.) _____ 0.910–0.920.
Refractive index (20° C.) _____ 1.479.
Viscosity (Gardner-Holdt, 25° C.) _____ A–3.
Pounds/gallon _____ 7.6.

(G) "Mark WS," a product of the Argus Chemical Company, reported to be a mixture of barium and cadmium salts of lauric acid.

(H) "Mark C," a product of the Argus Chemical Company, which is a liquid at room temperature.

The pressure-sensitive adhesive tapes of this invention may be produced according to known and proven methods utilizing known aggressively tacky pressure-sensitive adhesives, primers, and/or low adhesion backsizes. U.S. Patents Nos. Re. 23,843, 2,319,959, 2,410,079, 2,532,011, 2,567,671, 2,607,711, 2,725,981, 2,876,894, 2,884,126, and 2,889,038 describe and claim numerous types of these compositions. In the working examples certain preferred compositions have been employed. They are as follows:

PRESSURE-SENSITIVE ADHESIVES (A)

100 parts crude rubber
75 parts of a pure hydrocarbon polyterpene tackifying resin (e.g. "Piccolyte S115")
1 part 2,5-ditertiary amyl hydroquinone
78.4 parts heptane (B)

An 18 percent solution of a copolymer of 95½ parts iso-octyl acrylate and 4½ parts acrylic acid in a solvent mixture of 70 parts heptane and 30 parts isopropanol. This copolymer may be prepared in accordance with the teachings of U.S. Patent No. 2,884,126.

(C)

50 parts smoked sheet rubber
50 parts GRS 1011, a copolymer of approximately 75 parts butadiene and 25 parts styrene
1 part 2,5-ditertiary amyl hydroquinone
60 parts titanium dioxide 40 parts of a pure hydrocarbon polyterpene tackifying resin (e.g., "Piccolyte S115")
0.5 part octadecyl amine
574 parts heptane
15 parts ethyl alcohol (D)

100 parts ethyl vinyl ether polymer
470 parts heptane

PRIMER (A)

53 parts of a terpolymer containing 72 parts butadiene, 18 parts styrene and 10 parts acrylonitrile
47 parts GRS 1011
50 parts of a pure hydrocarbon polyterpene tackifying resin (e.g., "Piccolyte S115")
410 parts heptane
620 parts methyl isobutyl ketone
4.1 parts ethyl alcohol This primer is described and claimed in the Revoir application S.N. 727,768, since issued as U.S. Patent No. 2,897,960.

LOW ADHESION BACKSIZE (A) A 5 percent solution in toluene of the reaction product of N-octadecyl isocyanate and polyvinyl alcohol, as described in U.S. Patent No. 2,532,011.

This invention may be illustrated further by reference to the following examples in which all "parts" are expressed as parts by weight and all "percentages" are expressed as percent by weight, unless specified otherwise. Inherent viscosities were measured in a 0.1% cyclohexanone solution at 25° C. in a Cannon-Fenske viscometer.

In each of these examples, the pressure-sensitive adhesive tapes could be dispensed with ease in a conventional manual serrated-edge dispenser and in a manner and with tear characteristics closely simulating cellophane pressure-sensitive adhesive tapes.

Example 1

This example describes the preparation of a pressure-sensitive adhesive tape from polyvinyl chloride homopolymer backing which was prepared by calendering the polymer formulation and biaxially stretching the film. The polyvinyl chloride homopolymer was "Vinylite QYSJ," a product of the Union Carbide Chemical Company, and had an inherent viscosity of 0.71.

Fifty pounds of the polyvinyl chloride homopolymer, 5 pounds of the previously described processing aid A, and one pound of stearic acid were blended in a Hobart mixer. To this blend was added a mixture of liquid stabilizers comprising 1.5 pounds of stabilizer A, 1.5 pounds of stabilizer B, 0.5 pound of stabilizer C, and 1 pound of stabilizer D. After mixing for 30 minutes in the Hobart mixer, the mixture was treated in the following sequence of steps to produce the film and the pressure-sensitive adhesive tape:

(1) Fused on a 30 inch mill which had been heated to 350° F.

(2) Calendered on a 30 inch inverted L calender at a running speed of 25 feet per minute in which the rolls are heated to 330–340° F. to produce an 8 mil film which was trimmed to a uniform width of 20 inches.

(3) Stretched lengthwise over idler rolls heated to 200° F. between two sets of nip rolls running at a speed differential of 2.9 to 1.

(4) Stretched crosswise in a tentering frame in an oven heated to 200° F. to effect a crosswise stretch ratio of 1.62 to 1.

(5) Both edges of the biaxially stretched film were trimmed to produce a uniform 24 inch wide film. (The physical characteristics of this film are shown in Table I.)

(6) Coated with primer A on the face side and dried by passing it over a drum drier heated to 140° F.

(7) Coated on the back side with low adhesion backsize A and dried.

(8) Coated on the primed side with pressure-sensitive adhesive A and dried in an oven at 140° F. to remove the solvent.

(9) Wound upon itself in a jumbo roll.

(10) Slit and wound into tape rolls.

Example 2

This example shows the preparation of tape prepared in the same manner as the tape in Example 1 except that the polyvinyl chloride homopolymer had an inherent viscosity of 1.12 and the stretch ratios were 3 to 1 lengthwise and 1.57 to 1 crosswise. Table I lists the physical characteristics of the film.

Example 3

The tape of this example was prepared in the same manner as the tape of Example 1 except that no processing aid was added to the formulation, the polyvinyl chloride homopolymer had an inherent viscosity of 0.71 and the stretch ratios were 2.8 to 1 lengthwise and 1.8 to 1 crosswise.

Example 4

This example describes the preparation of a white pressure-sensitive adhesive tape from polyvinyl chloride homopolymer backing which was prepared by calendering the polymer formulation on a Z calender and biaxially stretching the film. The polyvinyl chloride homopolymer was "Vinylite QYSJ," a product of the Union Carbide Chemical Company, and had an inherent viscosity of 0.71.

One hundred parts of the polyvinyl chloride homopolymer, 10 parts of processing aid A and two parts of stearic acid were blended in a Hobart mixer. To this blend was added a mixture of liquid stabilizers comprising 3 parts of stabilizer A, 3 parts of stabilizer B, 1 part of stabilizer C, and 2 parts of stabilizer D. After mixing for 30 minutes in the Hobart mixer, the mixture was treated in the following sequence of steps to produce the film and tape:

(1) Fused in a Banbury mixer and dropped at 310° F. onto a 30 inch mill which had been heated to 350° F.

(2) Calendered on a 40 inch Z calender with rolls heated to 330 to 350° F. at a running speed of 25 yards per minute to produce a 6 mil film which was trimmed to uniform width of 26 inches.

(3) Stretched lengthwise over idler rolls heated to 180° F. between two sets of nip rolls running at a speed differential of 2.2 to 1.

(4) Stretched crosswise in a tentering frame in an oven heated to 200° F. to effect a crosswise stretch ratio of 2.2 to 1.

(5) Both edges of the biaxially stretched film were trimmed to produce a uniform 38 inch wide film. (The physical characteristics of this film are shown in Table I.)

(6) Coated with primer A on the face side and dried by passing over a drum drier heated to 140° F.

(7) Coated on the primed side with pressure-sensitive adhesive C and dried in an oven at 130 to 135° F. to remove the solvent.

(8) Wound upon itself in a jumbo roll.

(9) Slit and wound into tape rolls of opaque white tape.

Example 5

This example describes the preparation of a red transparent pressure-sensitive adhesive tape from polyvinyl chloride homopolymer backing which was prepared by calendering the polymer formulation and biaxially stretching the film. The polyvinyl chloride homopolymer was "Vinylite QYSJ," a product of the Union Carbide Chemical Company, and had an inherent viscosity of 0.71.

One hundred parts of the polyvinyl chloride homopolymer, 10 parts of processing aid A, and 2 parts of stearic acid were blended in a Hobart mixer. To this blend was added a mixture of liquid stabilizers comprising 3 parts of stabilizer A, 3 parts of stabilizer B, 1 part of stabilizer C, 2 parts of stabilizer D, and 5 parts of a red dye which is essentially a methyl derivative of azobenzene-4-azo-2-naphthol. After mixing for 30 minutes in the Hobart mixer, the mixture was treated in the following sequence of steps to produce the film and tape:

(1) Fused in a Banbury mixer and dropped at 310° F. onto a 30 inch mill which had been heated to 350° F.

(2) Calendered on a 40 inch Z calender with rolls heated to 330 to 350° F. at a running speed of 25 yards per minute to produce a 6 mil film which was trimmed to uniform width of 26 inches.

(3) Stretched lengthwise over idler rolls heated to 190° F. between two sets of nip rolls running at a speed differential of 2.45 to 1.

(4) Stretched crosswise in a tentering frame in an oven heated to 190° F. to effect a crosswise stretch ratio of 1.71 to 1.

(5) Both edges of the biaxially stretched film were trimmed to produce a uniform 28 inch wide film. (The physical characteristics of this film are shown in Table I.)

(6) Coated with primer A on the face side and dried by passing over a drum drier heated to 140° F.

(7) Coated on the back side with low adhesion backsize A.

(8) Coated on the primed side with pressure-sensitive adhesive A and dried in an oven at 145° F. to remove the solvent.

(9) Wound upon itself in a jumbo roll.

(10) Slit and wound into tape rolls.

By following the procedure of this example but omitting the red dye from the formulation, a film was prepared which when coated with pressure-sensitive adhesive B gave an excellent pressure-sensitive adhesive tape. This same film was employed to prepare a linerless double-coated tape in accordance with the teachings of U.S. Patent No. 2,889,038.

*Example 6*

This example describes the preparation of a pressure-sensitive adhesive tape from polyvinyl chloride polymer backing which was prepared by calendering the polymer formulation and biaxially stretching the film. The polyvinyl chloride polymer was "Vinylite VYNW," a product of the Union Carbide Chemical Company which is reported to contain 97% vinyl chloride and 3% vinyl acetate and had an inherent viscosity of 1.06.

One hundred parts of the polyvinyl chloride polymer and one part of stearic acid were blended in a Hobart mixer. To this blend was added a mixture of liquid stabilizers comprising 3 parts of stabilizer A, 3 parts of stabilizer B, 1 part of stabilizer C, and 2 parts of stabilizer D. After mixing for 30 minutes in the Hobart mixer, the mixture was treated in the following sequence of steps to produce the film and tape:

(1) Fused in a Banbury mixer.

(2) Calendered on a 16 inch Z calender heated to 340 to 395° F. at a running speed of 6 feet per minute to produce a 6 mil film which was trimmed to uniform width of 7½ inches.

(3) Stretched lengthwise in an oven heated to 180° F. between two sets of nip rolls running at a speed differential of 2.5 to 1.

(4) Stretched crosswise in a tentering frame in an oven heated to 190° F. to effect a crosswise stretch ratio of 3 to 1.

(5) Both edges of the biaxially stretched film were trimmed to produce a uniform 6 inch wide film. (The physical characteristics of this film are shown in Table I.)

(6) Coated with primer A on the face side and dried by passing over a drum drier heated to 120° F.

(7) Coated on the back side with low adhesion backsize A.

(8) Coated on the primed side with pressure-sensitive adhesive A and dried in an oven at 135° F. to remove the solvent.

(9) Wound upon itself in a jumbo roll.

(10) Slit and wound into tape rolls.

*Example 7*

This example describes the preparation of a pressure-sensitive adhesive tape from polyvinyl chloride homopolymer backing which was prepared by calendering the polymer formulation and biaxially stretching the film. The polyvinyl chloride homopolymer was "Geon 103EP," a product of the B. F. Goodrich Chemical Company, and had an inherent viscosity of 0.97.

One hundred parts of the polyvinyl chloride homopolymer and one part of stearic acid were blended in a Hobart mixer. To this blend was added a mixture of liquid stabilizers comprising 3 parts of stabilizer A, 3 parts of stabilizer B, 1 part of stabilizer C, and two parts of stabilizer D. After mixing for 30 minutes in the Hobart mixer, the mixture was treated in the following sequence of steps to produce the film and tape:

(1) Fused in a Banbury mixer and dropped on a 350° F. mill.

(2) Calendered on a 16 inch Z calender heated to 365 to 395° F. at a running speed of 6 feet per minute to produce a film which was trimmed to uniform width of 7½ inches.

(3) Stretched lengthwise while being heated by a radiant heater between two sets of nip rolls running at a speed differential of 4 to 1.

(4) Stretched crosswise in a tentering frame in an oven heated to 190° F. to effect a crosswise stretch ratio of 2.5 to 1.

(5) Both edges of the biaxially stretched film were trimmed to produce a uniform 6 inch wide film. (The physical characteristics of this film are shown in Table I.)

(6) Coated with primer A on the face side and dried by passing over a drum drier heated to 135° F.

(7) Coated on the back side with low adhesion backsize A.

(8) Coated on the primed side with pressure-sensitive adhesive A and dried in an oven at 140° F. to remove the solvent.

(9) Wound upon itself in a jumbo roll.

(10) Slit and wound into tape rolls.

*Example 8*

This example describes the preparation of a pressure-sensitive adhesive tape from polyvinyl chloride polymer backing which was prepared by calendering the polymer formulation and biaxially stretching the film. The polyvinyl chloride polymer was "Vinylite VYNW," a product of the Union Carbide Chemical Company which is reported to contain 97% vinyl chloride and 3% vinyl acetate and had an inherent viscosity of 1.06.

One hundred parts of the polyvinyl chloride polymer and one part of stearic acid were blended in a Hobart mixer. To this blend was added a mixture of liquid stabilizers comprising 3 parts of stabilizer A, 3 parts of stabilizer B, 1 part of stabilizer C, and 2 parts of stabilizer D. After mixing for 30 minutes in the Hobart mixer, the mixture was treated in the following sequence of steps to produce the film and tape:

(1) Fused in a Banbury mixer and dropped to a mill which had been heated to 350° F.

(2) Calendered on a 16 inch Z calender heated to 365 to 395° F. at a running speed of 6 feet per minute to produce an 8 mil film which was trimmed to uniform width of 7½ inches.

(3) Stretched lengthwise in an oven heated to 190° F. between two sets of nip rolls running at a speed differential of 3 to 1.

(4) Stretched crosswise in a tentering frame in an oven heated to 190° F. to effect a crosswise stretch ratio of 2.4 to 1.

(5) Both edges of the biaxially stretched film were trimmed to produce a uniform 6 inch wide film. (The physical characteristics of this film are shown in Table I).

(6) Coated on the back side with low adhesion backsize A.

(7) Coated on the front side with pressure-sensitive adhesive D and dried in an oven at 140° F. to remove the solvent.

(8) Wound upon itself in a jumbo roll.

(9) Slit and wound into tape rolls.

*Example 9*

This example describes the preparation of a pressure-sensitive adhesive tape from polyvinyl chloride homopolymer backing which was prepared by calendering the polymer formulation and biaxially stretching the film. The polyvinyl chloride homopolymer was "Vinylite QYSJ," a product of the Union Carbide Chemical Company, and had an inherent viscosity of 0.71.

One hundred parts of the polyvinyl chloride homopolymer, 10 parts of processing aid A, and one part of stearic acid were blended in a Hobart mixer. To this blend was added a mixture of liquid stabilizers comprising 12 parts of stabilizer A, one part of stabilizer B, 2 parts of stabilizer E, 1 part of stabilizer F, and one part of stabilizer G. After mixing for 30 minutes in the Hobart mixer, the mixture was treated in the following sequence of steps to produce the film and tape:

(1) Fused on a 350° F. mill.

(2) Calendered on a 12" three roll calender.

(3) Stretched lengthwise over idler rolls heated to 190° F. between two sets of nip rolls running at a speed differential of 2.7 to 1.

(4) Stretched crosswise in a tentering frame in an oven heated to 190° F. to effect a crosswise stretch ratio of 1.7 to 1.

(5) Both edges of the biaxially stretched film were trimmed to produce a uniform 6 inch wide film. (The physical characteristics of this film are shown in Table I.)

(6) Coated with primer A on the face side and dried by passing over a drum drier heated to 120° F.

(7) Coated with pressure-sensitive adhesive A and dried in an oven at 130° F. to remove the solvent.

(8) Wound upon itself in a jumbo roll.

(9) Slit and wound into tape rolls.

*Example 10*

This example describes the preparation of a pressure-sensitive adhesive tape from polyvinyl chloride homopolymer backing which was prepared by calendering the polymer formulation and biaxially stretching the film. The polyvinyl chloride homopolymer was "Vinylite QYSJ," a product of the Union Carbide Chemical Company, and had an inherent viscosity of 0.71.

One hundred parts of the polyvinyl chloride homopolymer, 10 parts of processing aid A, and one part of stearic acid were blended in a Hobart mixer. To this blend was added a mixture of stabilizers comprising 3 parts of stabilizer G and 1 part of stabilizer H. After mixing for 30 minutes in the Hobart mixer, the mixture was treated in the following sequence of steps to produce the film and tape:

(1) Fused on a 30 inch mill which had been heated to 350° F.

(2) Calendered on a 40 inch Z calender heated to 350 to 360° F. at a running speed of 25 yards per minute to produce a six mil film which was trimmed to uniform width of 26 inches.

(3) Stretched lengthwise over idler rolls heated to 206° F. between two sets of nip rolls running at a speed differential of 2.5 to 1.

(4) Stretched crosswise in a tentering frame in an oven heated to 220° F. to effect a crosswise stretch ratio of 2 to 1.

(5) Both edges of the biaxially stretched film were trimmed to produce a uniform 28 inch wide film. (The physical characteristics of this film are shown in Table I.)

(6) Coated with primer A on the face side and dried by passing over a drum drier heated to 135° F.

(7) Coated on the back side with low adhesion backsize A.

(8) Coated on the primed side with pressure-sensitive adhesive A and dried in an oven at 140° F. to remove the solvent.

(9) Wound upon itself in a jumbo roll.

(10) Slit and wound into tape rolls.

*Example 11*

This example describes the preparation of a pressure-sensitive adhesive tape from polyvinyl chloride polymer backing which was prepared by calendering the polymer formulation and biaxially stretching the film. The polyvinyl chloride polymer was "Vinylite VYNS," a product of the Union Carbide Chemical Company which is reported to contain 90% vinyl chloride and 10% vinyl acetate and had an inherent viscosity of 0.65.

One hundred parts of the polyvinyl chloride polymer, 4 parts stabilizer G and 1 part of stearic acid were blended in a Hobart mixer. To this blend was added 0.5 part of stabilizer H. After 30 minutes in the Hobart mixer, the mixture was treated in the following sequence of steps to produce the film and tape:

(1) Fused on a 350° F. mill.

(2) Calendered on a 12 inch three roll calender heated to 350° F. at a running speed of 2 yards per minute to produce a 6 mil film which was trimmed to uniform width of 8 inches.

(3) Stretched lengthwise over idler rolls heated to 190° F. between two sets of nip rolls running at a speed differential of 2.7 to 1.

(4) Stretched crosswise in an oven heated to 190° F. between two sets of diverging clips attached to endless chains to effect a crosswise stretch ratio of 1.7 to 1.

(5) Both edges of the biaxially stretched film were trimmed to produce a uniform 6 inch wide film. (The physical characteristics of this film are shown in Table I.)

(6) Coated with primer A on the face side and dried by passing over a drum drier heated to 110° F.

(7) Coated on the back side with low adhesion backsize A.

(8) Coated on the primed side with pressure-sensitive adhesive A and dried in an oven at 135° F. to remove the solvent.

(9) Wound upon itself in a jumbo roll.

(10) Slit and wound into tape rolls.

*Example 12*

This example describes the preparation of a pressure-sensitive adhesive tape from polyvinyl chloride homopolymer backing which was prepared by extruding the polymer formulation and biaxially stretching the film. The polyvinyl chloride homopolymer was "Geon 101EP," a product of the B. F. Goodrich Chemical Company, and had an inherent viscosity of 1.12.

One hundred pounds of the polyvinyl chloride homopolymer, one pound of stearic acid, and a mixture of liquid stabilizers comprising 3 pounds of stabilizer A, 3 pounds of stabilizer B, 1 pound of stabilizer C, and 2 pounds of stabilizer D were mixed for 30 minutes in a Hobart mixer. The mixture was treated in the following sequence of steps to produce the film and tape:

(1) Fed the dry blend to a 1¾ inches diameter Prodex extruder (Model No. 175-24) and extruded at a melt temperature of 370° F. at a rate of 30 pounds per hour from a 9 inch wide die to produce a 5 mil film which was 7½ inches wide.

(2) Stretched lengthwise over idler rolls heated to 250° F. between two sets of nip rolls running at a speed differential of 2.5 to 1.

(3) Stretched crosswise in a tentering frame in an oven heated to 190° F. to effect a crosswise stretch ratio of 2.0 to 1.

(4) Both edges of the biaxially stretched film were trimmed to produce a uniform 6¾ inches wide film. (The physical characteristics of this film are shown in Table I.)

(5) Coated with primer A on the face side and dried by passing over a drum drier heated to 120° F.

(6) Coated on the back side with low adhesion backsize A.

(7) Coated on the primed side with pressure-sensitive adhesive A and dried in an oven at 135° F. to remove the solvent.

(8) Wound upon itself in a jumbo roll.

(9) Slit and wound into tape rolls.

*Example 13*

This example describes the preparation of a pressure-sensitive adhesive tape from polyvinyl chloride homopolymer backing which was prepared by extruding the polymer formulation and stretching the film lengthwise only with lateral restraint. The polyvinyl chloride homopolymer was "Geon 101EP," a product of the B. F. Goodrich Chemical Company, and had an inherent viscosity of 1.12.

One hundred pounds of the polyvinyl chloride homopolymer, one pound of stearic acid, and a mixture of liquid stabilizers comprising 3 pounds of stabilizer A, 3 pounds of stabilizer B, 1 pound of stabilizer C, and 2 pounds of stabilizer D were mixed for 30 minutes in a Hobart mixer. The mixture was treated in the following sequence of steps to produce the film and tape:

(1) Fed the dry blend to a 1¾ inch diameter Prodex extruder (Model No. 175-24) and extruded at a melt temperature of 370° F. at a rate of 30 pounds per hour from a 9 inch wide die to produce a 3½ mil film which was 7 inches wide.

(2) Stretched lengthwise over idler rolls heated to 250° F. between two sets of nip rolls running at a speed differential of 2.6 to 1 to produce a film which was 6¾ inches wide.

(3) Coated with primer A on the face side and dried by passing over a drum drier heated to 120° F.

(4) Coated on the back side with low adhesion backsize A.

(5) Coated on the primed side with pressure-sensitive adhesive A and dried in an oven at 135° F. to remove the solvent.

(6) Wound upon itself in a jumbo roll.

(7) Slit and wound into tape rolls.

*Example 14*

Vinyl chloride polymer compound, "Geon 81414," a product of the B. F. Goodrich Chemical Company, was fed to 1¾ inches diameter Prodex extruder (Model No. 175-24) and extruded at a melt temperature of 405° F. at a rate of 40 pounds per hour from a 9 inch wide die to produce an 8 mil film which was 7¾ inches wide. This film was then oriented and made into a pressure-sensitive adhesive tape as follows:

(1) Stretched lengthwise over idler rolls heated to 210° F. between two sets of nip rolls running at a speed differential of 3 to 1.

(2) Stretched crosswise in a tentering frame in an oven heated to 220° F. to effect a crosswise stretch ratio of 2.3 to 1.

(3) Both edges of the biaxially stretched film were trimmed to produce a uniform 6 inch wide film. (The physical characteristics of this film are shown in Table I.)

(4) Coated with primer A on the face side and dried by passing over a drum drier heated to 110° F.

(5) Coated on the back side with low adhesion backsize A.

(6) Coated on the primed side with pressure-sensitive adhesive A and dried in an oven at 110° F. to remove the solvent.

(7) Wound upon itself in jumbo rolls.

(8) Slit and wound into tape rolls.

*Example 15*

A commercially available unoriented rigid polyvinyl chloride film having a caliper of 7 mils was biaxially oriented and made into a pressure-sensitive adhesive tape as follows:

(1) Stretched lengthwise over idler rolls heated to 190° F. between two sets of nip rolls running at a speed differential of 3 to 1.

(2) Stretched crosswise in a tentering frame in an oven heated to 190° F. to effect a crosswise stretch ratio of 1.54 to 1.

(3) Both edges of the biaxially stretched film were trimmed to produce a uniform 6 inch wide film. (The physical characteristics of this film are shown in Table I.)

(4) Coated with primer A on the face side and dried by passing over a drum drier heated to 120° F.

(5) Coated with low adhesion backsize A.

(6) Coated with pressure-sensitive adhesive A and dried in an oven at 135° F. to remove the solvent.

(7) Wound upon itself in a jumbo roll.

(8) Slit and wound into tape rolls.

Although this invention has been described with particular reference to the homopolymer of vinyl chloride, it will be appreciated that a minor amount of a comonomer may be copolymerized with vinyl chloride to yield a product having substantially the same physical properties as the homopolymer. Accordingly, the terms "polyvinyl chloride" and "vinyl chloride polymer" as employed in this application are intended to cover not only strict homopolymers but also copolymers with comonomers in small proportion serving to modify the properties without impairing the essential characteristic of the strict homopolymers. Generally speaking, the copolymers contain at least 85 precent by weight of vinyl chloride units.

*Table I*

| Example | Caliper (mils) | Tensile[1] Properties (p.s.i.) | | Elongation[1] (percent) | | Stiffness Modulus[2] | Hot Stretch,[3] 140° F. |
|---|---|---|---|---|---|---|---|
| | | Lengthwise at break | Crosswise at break | Lengthwise at break | Crosswise at break | | |
| 1 | 1.6 | 20,500 | 10,500 | 47 | 98 | 5.76×10⁵ | 0.55 |
| 2 | 1.6 | 25,600 | 10,700 | 40 | 105 | 5.85 | 0.55 |
| 3 | 1.2 | 19,500 | 8,100 | 51 | 50 | 5.68 | 0.9 |
| 4 | 1.7 | 16,500 | 8,600 | 59 | 65 | 5.3 | 2.0 |
| 5 | 1.7 | 19,100 | 7,200 | 45 | 36 | 6.2 | 0.9 |
| 6 | 1.0 | 16,200 | 12,200 | 59 | 43 | 4.6 | 0.9 |
| 7 | 1.0 | 33,000 | 9,000 | 29 | 98 | 7.15 | .45 |
| 8 | 1.6 | 21,900 | 6,800 | 59 | 120 | [4] N.A. | [4] N.A. |
| 9 | 1.2 | 14,000 | 5,800 | 25 | 30 | 5.4 | 2.8 |
| 10 | 1.7 | 19,700 | 6,900 | 32 | 72 | 5.3 | 0.7 |
| 11 | 1.2 | 19,300 | 10,300 | 51 | 73 | 5.5 | 2.1 |
| 12 | 1.0 | 22,700 | 12,000 | 42 | 60 | 5.7 | 0.8 |
| 13 | 1.3 | 32,000 | 4,900 | 19 | 150 | 7.8 | 0.3 |
| 14 | 1.0 | 15,500 | 10,800 | 60 | 131 | 4.6 | [5] 0.8 |
| 15 | 1.8 | 18,600 | 6,800 | 32 | 123 | 5.15 | 1.0 |

[1] Measured on a Model TM Instron machine by securing a segment of the film in the upper stationary jaw and the lower movable jaw which are initially 4 inches apart and moving the lower jaw downward at a rate of 1 inch per minute until it breaks. The tensile strength is expressed as pounds per square inch of stress applied at the instant it breaks based on original cross-sectional area. The elongation is expressed as the percent of its original length to which the sample is elongated at break, i.e., a 4 inch sample elongating 4 inches would have an elongation of 100%.

[2] Measured on a Model TM Instron machine by securing a segment of the film in the upper stationary jaw and the lower movable jaw which are initially 10 inches apart and moving the lower jaw downward at a rate of 1 inch per minute so that at the end of 6 seconds one percent elongation has occurred and the measurement taken at that point is expressed as pounds per square inch of cross-sectional area multiplied by 100.

[3] Measured by securing a 10 cm. segment of the film having a width of one inch between a lower stationary jaw and an upper movable jaw in an oven maintained at the designated temperature, applying a stress of 1700 pounds per square inch of initial cross-sectional area to the movable is jaw and determining the amount of stretch over a 3 minute period which expressed as a percentage of the original length.

[4] Not available.

[5] Measured at 120° F.

It will be noted that in each of the foregoing examples, the film has not been subjected to mere lengthwise tensilization (stretching), but has been stretched or restrained in the crosswise direction so as to markedly increase the crosswise elongation value. This results in each case in substantially increasing the crosswise toughness of the product film; toughness being proportional to the area under the stress-strain curve as is well known. Hence the film product is appropriately characterized in the claims as being "cross-toughened," as well as "tensilized."

We claim:

1. A pressure-sensitive adhesive tape having a transparent film backing coated with an aggressively tacky pressure-sensitive adhesive, characterized by the feature that said backing is a transparent, rigid, tensilized and cross-stretched, so as to be cross-toughened, film consisting essentially of unplasticized polyvinyl chloride, said film having a thickness of from 1 to 2 mils, a lengthwise stiffness modulus of at least $4.5 \times 10^5$ pounds per square inch of cross-sectional area measured at 1 percent elongation, a lengthwise elongation at break of less than 100 percent, a crosswise elongation at break of from 25 to 150 percent, a lengthwise tensile strength of at least 13,000 pounds per square inch, and a crosswise tensile strength of at least 4000 pounds per square inch; said film not having been subjected to a temperature above 250° F. during or after tensilization processing.

2. A pressure-sensitive adhesive tape wound upon itself in roll form, having a transparent film backing coated with an aggressively tacky pressure-sensitive adhesive, characterized by the feature that said backing is a transparent, rigid, tensilized and cross-stretched, so as to be cross-toughened, film consisting essentially of unplasticized polyvinyl chloride, said film having a thickness of from 1 to 2 mils, a lengthwise stiffness modulus of at least $4.5 \times 10^5$ pounds per square inch of cross-sectional area measured at 1 percent elongation, a lengthwise elongation at break of less than 60 percent, a crosswise elongation at break of from 50 to 150 percent, a lengthwise tensile strength of at least 13,000 pounds per square inch, and a crosswise tensile strength of at least 7000 pounds per square inch; said film not having been subjected to a temperature above 250° F. during or after tensilization processing.

References Cited in the file of this patent

UNITED STATES PATENTS

| 2,554,791 | Nickerson | May 29, 1951 |
| 2,812,550 | Chavannes | Nov. 12, 1957 |
| 2,897,960 | Revoir | Aug. 4, 1959 |

OTHER REFERENCES

Platzer, "Unplasticized Polyvinyl Chloride," Modern Plastics, pages 112–118, July 1951.

Schildknecht, "Vinyl and Related Polymers," pages 437–439, John Wiley and Sons, New York, 1952.

UNITED STATES PATENT OFFICE
CERTIFICATE OF CORRECTION

Patent No. 3,089,786            May 14, 1963

Henry G. Nachtsheim et al.

It is hereby certified that error appears in the above numbered patent requiring correction and that the said Letters Patent should read as corrected below.

Column 4, lines 25 and 34, for "(20° C.)", each occurrence read -- (25° C.) --.

Signed and sealed this 7th day of April 1964.

(SEAL)
Attest:

ERNEST W. SWIDER

Attesting Officer

EDWARD J. BRENNER

Commissioner of Patents